United States Patent [19]

Kimura et al.

[11] Patent Number: 4,671,112

[45] Date of Patent: Jun. 9, 1987

[54] ANGULAR VELOCITY SENSOR

[75] Inventors: Suzushi Kimura, Sakai; Hiroshi Yamaguchi, Neyagawa, both of Japan

[73] Assignee: Matsushita Electric Industrial Co., Ltd., Osaka, Japan

[21] Appl. No.: 714,682

[22] Filed: Mar. 21, 1985

[30] Foreign Application Priority Data

Mar. 22, 1984 [JP] Japan .................................. 59-55420
Apr. 26, 1984 [JP] Japan .................................. 59-85419

[51] Int. Cl.⁴ ............................................. G01P 15/10
[52] U.S. Cl. ..................................................... 73/505
[58] Field of Search .................. 73/505; 310/329, 321, 310/370

[56] References Cited

U.S. PATENT DOCUMENTS

| | | | |
|---|---|---|---|
| 2,753,173 | 7/1956 | Barnaby et al. | 73/505 |
| 2,974,530 | 3/1961 | Jaouen | 73/505 |
| 3,307,409 | 3/1967 | Newton, Jr. | 73/505 |
| 3,839,915 | 10/1974 | Schlitt | 73/505 |
| 4,479,098 | 10/1984 | Watson | 310/318 X |
| 4,628,734 | 12/1986 | Watson | 73/505 |

FOREIGN PATENT DOCUMENTS

| | | | |
|---|---|---|---|
| 84704 | 8/1983 | European Pat. Off. | 73/505 |
| 726653 | 4/1980 | U.S.S.R. | 310/370 |

Primary Examiner—Stewart J. Levy
Assistant Examiner—Scott M. Oldham
Attorney, Agent, or Firm—Amster, Rothstein & Ebenstein

[57] ABSTRACT

An angular velocity sensor of the tuning-fork gyro type includes a first oscillating element including a drive element and a detection element and a second oscillating element including a monitor element and a detection element. A single resilient member couples the oscillating elements to a base support. Drive power is supplied only to the drive element which oscillates and causes the second oscillating element to oscillate. A signal produced by the monitor element is used to adjust the drive power and is combined with the signal produced by the detection elements to produce an output signal indicative of angular velocity.

7 Claims, 3 Drawing Figures

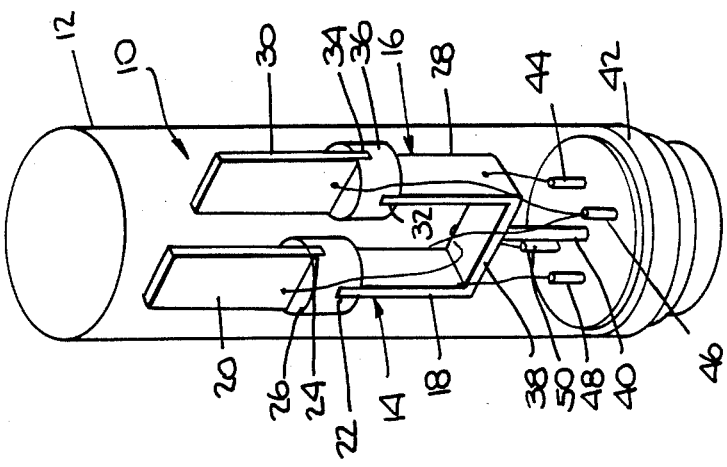

ANGULAR VELOCITY SENSOR

The present invention relates to an angular velocity sensor.

In recent years, with the development of computer technology and various multi-function products, demand for various types of sensors had increased. Among the sensors which are important to these types of products is an angular velocity sensor used to detect the angular velocity of an object to which the sensor is attached. Such angular velocity sensors are used, for example, in electronic navigation systems, direction sensing devices and stabilizers for robots. Due to the nature of these applications, those angular velocity sensors are required to be small in size and yet have high performance accuracy.

Conventionally, mechanical inertial navigation systems incorporating gyroscopes have been used to determine the bearing of a moving object such as an airplane or a ship. To insure stable direction detection, these mechanical inertial navigation systems require relatively large and expensive mechanical structures. such devices cannot, therefore, be applied to consumer equipment which should be small in size and of relatively low cost.

An angular velocity sensor can be based upon the principles of a vibratory gyro, which, in general, is described in U.S. Pat. No. 2,544,646 issued Mar. 13, 1951. According to the principles described in U.S. Pat. No. 2,544,646, if a mass is oscillated in a straight line along which it is guided by a constraint, the mass applies no force transversely to the guide unless the guide is given a forced rotation about an axis at right angles to itself. In that event, the oscillating mass applies to the guide transverse alternating or pulsating forces having an average magnitude which is proportional to the angular velocity of the forced rotation. Sensing of these forces provides an indication of the angular velocity of the mass and hence the angular velocity of the object to which the mass is secured.

The use of an oscillating element to determine the angular velocity of a structure to which the oscillating element is secured depends upon the detection of the so-called Coriolis force. It is well known that if, for example, a rod oscillating about an axis is given a linear velocity along the axis of oscillation and at the same time given an angular velocity about an axis perpendicular to the axis of linear velocity, a force, known as the Coriolis force, is produced along a third axis at right angles to the other axes. the magnitude of the force and its direction depend upon the angular velocity of the structure and the direction of rotation. Thus, detection of the Coriolis force can be used to measure the magnitude and direction of the angular velocity.

The use of an oscillating element to sense angular rotational velocity can result in measurement errors caused by factors associated with the oscillating and mounting systems, among others.

U.S. Pat. No. 2,544,646 describes a vibratory-type angular velocity sensor, known as a tuning-fork gyro, in which a pair of oscillating sensor elements are mounted on a supporting base for oscillation in directions opposite to one another about a nodal axis. The respective vibrational forces about the nodal axis transmitted from the oscillating sensor elements to the supporting base cancel about the nodel axis such that vibrational forces transmitted to the supporting base are negligible. Rotation of the structure about the nodal axis produces a force having a magnitude which can be measured to provide an indication of angular velocity.

In a specific embodiment of the tuning-fork gyro disclosed in U.S. Pat. No. 2,544,646, each of the two counter-oscillating elements includes an elastic drive element and an elastic detection element which are generally in the form of thin elongated rectangular plates. One end of the elastic drive element and one end of the elastic detection element of each of the oscillating elements are secured in a block and oriented with their corresponding planes perpendicular to one another. The opposite ends of the elastic drive elements are secured to the supporting base and a block is secured to the opposite ends of the elastic detection elements. Angular velocity of the system is determined by applying a driving force to each of the elastic drive elements and sensing the position of the blocks secured to the end of the elastic detecting elements, the position of the mass being determined by the Coriolis force on the elastic detection elements and, therefore, being a measure of the angular velocity of the system.

Among the problems associated with the tuning-fork gyro are mismatches which occur between the two oscillating elements such as mismatches in materials and their electric and physical characteristics differences in size and mass, etc. These mismatches can introduce errors in the angular velocity measurements.

More recently, Japanese Laid-Open Patent Application No. 58-174854/1983 and corresponding published European Patent Application No. 84,704 in the name of William S. Watson (which European Patent Application refers to U.S. patent application Ser. No. 341,229 of Jan. 21, 1982) describes a tuning-fork gyro for determining angular velocity which operates on the same basic principles as the angular velocity sensor described in U.S. Pat. No. 2,544,646. The angular velocity sensor described in Japanese Laid-Open Patent Application No. 58-174854 uses a pair of oscillating elements each including a thin elongated rectangular piezoelectric drive and detection element secured with corresponding planes perpendicular to one another. An end of each piezoelectric drive element is mounted to an electrode mounting which extends between the ends of the drive elements and provides mechanical support for the oscillating elements and electrical connections for transmitting an electrical drive signal to each of the drive elements. Sensing means are electrically connected to the detection elements and provide signals which are indicative of angular velocity.

The tuning-fork gyro described in Japanese Laid-Open Patent Application No. 58-174854 can be effective to substantially reduce mismatch between the two oscillating elements comprising the oscillating system for small amplitude oscillations. However, to increase sensitivity and provide more accurate measurement of angular velocity, it is desirable to provide relatively large amplitude oscillation for the oscillatory elements. The mounting structure tends to cause mismatching during large amplitude oscillation because perfect coincidence of the piezoelectric characteristics, configurations, sizes and masses of the pair of oscillatory elements are nearly impossible to achieve in a mass production. There is also a limit to the match which can be made between the resonant frequency and resonant impedence of each oscillating element of the pair of oscillating elements. In addition, phase information with respect to the two oscillating elements cannot be obtained. Further, that type of tuning-fork gyro is susceptible to external noise and zero point drift. Inaccurate measurement of the Coriolis forces produced by the tuning-fork gyro are the result of these problems.

Accordingly, it is an object of the present invention to provide a tuning-fork gyro angular velocity sensor which has substantially improved performance over the prior tuning-fork gyro and is less susceptible to external noise, has reduced zero point drifts, and can be mass produced at relatively low cost.

It is a further object of the present invention to provide an angular velocity sensor which has high detection sensitivity.

Still further, it is an object of the invention to provide an angular velocity sensor in which angular velocity measurement inaccuracies caused by mismatches between the two oscillating elements comprising the oscillating element pair are minimized.

Another object of the invention is to provide a tuning-fork gyro angular velocity sensor in which the oscillating elements can be driven a relatively large amplitude without introducing measurement errors.

A more specific object of the invention is to provide a tuning-fork gyro angular velocity sensor in which the first of the oscillating elements comprises a drive element and a detection element, the second of the oscillating elements comprises a monitor element and a detection element and only the drive element of the first oscillating element is directly excited to cause the required vibration of the two oscillating elements.

Still further, it is another specific object of the invention to provide an elastic coupling member to couple the vibrating oscillating elements to a base support structure.

More particularly, the angular velocity sensor according to the present invention comprises a pair of oscillating elements. The first oscillating element comprises a relatively thin rectangular plate piezoelectric drive element and a relatively thin rectangular plate piezoelectric detecting element joined at one end such that the elements are oriented at a specified angle to each other, preferably 90 degrees. A second oscillating element comprises a relatively thin rectangular plate piezoelectric monitor element and a relatively thin rectangular plate piezoelectric detecting element also joined at one end such that the elements are oriented at a specified angle to one another, preferably 90 degrees. A coupling member joins the free end of the drive element of the first oscillating element to the free end of the monitor element of the second oscillating element. A single resilient supporting member couples the coupling member to a base. Excitation is applied to the piezoelectric drive element causing vibration of the first oscillating element which in turn causes vibration of the second oscillating element. The monitor element of the second oscillating element functions as a drive-detecting element producing a monitor output signal. The oscillating elements vibrate in a correctly matched condition enabling the piezoelectric detection elements to produce phase and amplitude signals of vibrations which are utilized in a detecting circuit to produce a signal representative of angular velocity.

The resultant angular velocity sensor has nearly perfect matching of resonant frequency and resonant impedance of the oscillating elements over a wide amplitude range. Thus, symmetrical velocity can be imparted to the piezoelectric detecting elements and the Coriolis force can be detected equally by each of the piezoelectric detection elements. In addition, nearly perfect cancellation of disturbances such as noise, gravity, acceleration and outside vibration can be obtained since these disturbances are absorbed by the elastic coupling member.

The angular velocity sensor is subject to reduced zeropoint drifts and has a high detecting accuracy. Since the angular velocity sensor is composed of piezoelectric elements, it is small in size, light in weight, and consumes only a small amount of electric power. Further by constructing the piezoelectric elements of the same piezoelectric material, temperature dependent characteristics are substantially reduced. These superior effects provide an angular velocity sensor having high detection sensitivity and good linearity.

Ideally, the single resilient supporting member supporting the vibrating oscillating elements is a single line member of high Young's modulus. This supporting member is very effective to cancel out vibrations of the two oscillating elements because the vibrations are not transmitted out of the angular velocity sensor. This cancellation effect permits the pair of oscillating elements to be made of a material having a high Q value which assures a highly stable oscillation. Compared with tuning-fork gyro angular velocity sensors of the past, and in particular the tuning-fork gyro sensor described in Japanese Laid-Open Patent Application No. 58-174854, a Q value of approximately ten times higher can be obtained. A high Q value means that the oscillating elements have a low resonant impedance and permit the angular velocity sensor to be driven by a small drive voltage. Therefore, only one oscillating element need be directly driven while the other oscillating element can include a monitor element. This arrangement is effective to obtain a monitor output signal from the monitor element which is used in providing a more accurate measure of angular velocity.

With the tuning-fork gyro angular velocity sensor, such as shown in Japanese Laid-Open Patent Application No. 58-174854, in which drive voltage is applied to each of the drive elements in each oscillating element to produce the tuning fork vibrations, the resonant characteristic of the admittance ($Y_D = I_D/V_D$) of each drive element is used to cause the vibrations. The drive voltage to drive each of the drive elements is, however, subject to a phase error. On the other hand, in accordance with the angular velocity sensor of the invention, the drive voltage is applied to only one drive element causing that drive element to vibrate in response to the driving current. The vibration of that drive element is transmitted via the coupling member to the monitor element to cause the monitor element to vibrate in the opposite direction to that of the driven element to produce tuning fork vibrations. This vibration is caused by using the resonant characteristic of the transfer admittance ($Y_{D-M} = I_M/V_D$) from the drive to the monitor element (where $I_M$ is the monitor current generated by the vibration of the monitor element).

Furthermore, in accordance with the invention, the driving voltage for the drive element is obtained from the monitor output signal generated by the monitor element and no phase error is introduced in the drive signal.

These and other objects and features of the invention will be further explained in conjunction with the following drawings, in which:

BRIEF DESCRIPTION OF THE DRAWINGS

FIG. 1 is an isometric representation of an angular rate sensor according to the present invention;

FIG. 2 is a diagram representing the electronic driving, monitoring and detecting circuitry for the angular velocity sensor of the invention.

Figure 3:
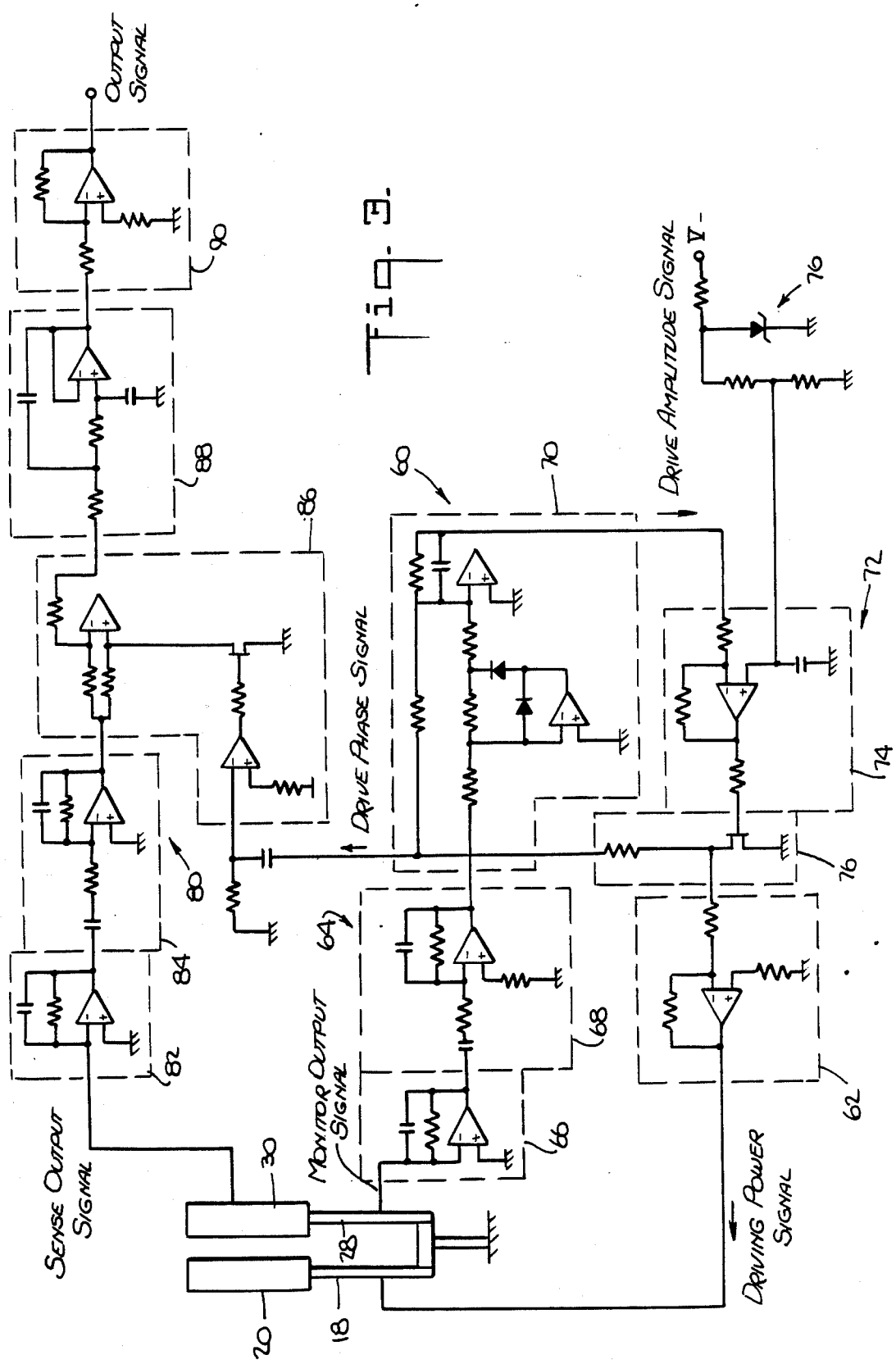
FIG. 3 is a diagram representing the electronic driving monitoring and detecting circuitry for the angular velocity sensor of the invention showing additional details of the circuitry shown in FIG. 2.

Referring first to FIG. 1, the angular velocity sensor 10 in mounted in a generally cylindrically shaped housing 12. Angular velocity sensor 10 includes first oscillating element 14 and second oscillating element 16. First oscillating element 14 has a relatively thin rectangular plate piezoelectric detection element 20. One end of drive element 18 and one end of detection element 20 is mounted in respective slots 22, 24 in the lower and upper surfaces respectively of joint member 26 with the corresponding planes of drive element 18 and detection element 20 oriented at an angle of 90 degrees relative to each other. Second oscillating element 16 includes a relatively thin rectangualr plate piezoelectric monitor element 28 and a relatively thin rectangular plate piezoelectric detector element 30. One end of monitor element 28 and detection element 30 are mounted in respective slots 32, 34 in the lower and upper surfaces of joint member 36 with the corresponding planes of monitor element 28 and detection element 30 oriented at an angle of 90 degrees relative to each other.

A coupling member 38 joins the second ends of drive element 18 and monitor element 28. Resilient supporting member 40 has one end secured to coupling member 38 and the other end secured to base 42 of housing 12. Electrodes 44, 46, 48 and 50 extend for electrical connections outside of housing 12 and are electrically coupled by thin wires to drive element 18, detection elements 20, 30 and monitor element 28 in a manner well known in the art.

Operation of angular velocity sensor 10 will now be described. A drive signal at the resonant frequency of piezoelectric drive element 18 is applied to both surfaces of piezoelectric drive element 18 via electrode 48 and lead wires connected thereto. The lead wires are as thin as possible and soldered to piezoelectric drive element 18 in the vicinity of coupling member 38 so as to minimize the influence on the oscillations of drive element 18. Alternative means of applying electric drive signals to drive member 18 can be used, as is known. First oscillating element 14 comprising drive element 18 and detection element 20 resonates causing second oscillator element 16 comprising monitor element 28 and detection element 30 to resonate at the same frequency but with opposite phase. Oscillation of oscillating element 16 is established within about one second or less after oscillation of first oscillating element 14 begins.

To achieve accurate and symmetrical oscillation of both first and second oscillating elements 14, 16 at the same frequency and opposite phase (i.e., a phase difference of 180 degrees), it is important to eliminate the effect of any mismatches in the construction of the first and second oscillating elements 14, 16. To this end, the mechanical energy of monitor element 28 is converted into a monitor output signal having a phase and amplitude component, which monitor output signal plays an important role in the operation of angular velocity sensor 10, as will be described below.

In general, the characteristics of a vibrating piezoelectric element having a cantilever construction are determined by the piezoelectric constant of the piezoelectric elements and the size and shape of the material. However, the characteristics of an angular velocity sensor using two vibrating piezoelectric elements are determined by the overall performance of the piezoelectric drive elements, the piezoelectric detecting elements and the influence of the manner of securing the drive and detection piezoelectric elements together. While differences in these components do not greatly affect the operation when small amplitude oscillations are used in an angular velocity sensor of this type, where the amplitude of oscillation is large, differences in oscillation characteristics of the two oscillating elements which exist result in inaccuracies of the measured angular velocity. It is difficult to obtain perfect coincidence in the characteristics of the various parts no matter how much effort is taken to match the components. Furthermore, differences in resonant impedance of the two oscillating elements increases with the difference in resonant frequency leading to a difference in the Coriolis forces acting on the piezoelectric detection elements making the angular velocity sensor more susceptible to noise disturbances.

In accordance with the invention, to accommodate differences between the characteristics of the two vibrating elements and provide a tuning-fork gyro angular velocity sensor having a high Q value, a resilient support member 40 is used to join the vibrating elements to base 42 of angular velocity sensor 10. Use of resilient support member 40 permits first and second oscillating elements 14, 16 to be made of materials having high Q values which assure stable oscillation. This construction makes it possible to accommodate differences in resonant frequency between the first and second oscillating elements 14, 16 of 10 hertz. It is relatively easy to manufacture first and second oscillating elements 14, 16 with a resonant frequency difference of 10 hertz. Resilient support member 40 should be made of a material having a high Young's modulus, such as bronze, brass, titanium, iron, aluminum or alloy type Elinvar. It is preferable that resilient support member 40 be as thin and as long as possible and such forms as a pipe, round bar or quandrangular bar are suitable.

Referring now to FIG. 2, there is shown the electronic circuitry, generally referred by reference numeral 60, for driving angular velocity sensor 10 and measuring the angular velocity imparted to angular velocity sensor 10. Driving circuit 62 applies a driving power signal to excite the system by driving drive element 18 into oscillation. The electric power supplied by driving circuit 62 is controlled by a drive amplitude signal from driving information extracting circuit 64 which responds to a monitor output signal produced by monitor element 28 as described in greater detail below, which maintains the system oscillations to allow the angular velocity sensor to have a constant sensitivity at all times. To maximize driving efficiency, the resonant system should be driven at its resonant frequency. To this end, the electronic circuitry providing driving power to drive element 18 is composed of an oscillation loop which includes piezoelectric drive element 18 as a frequency selective element. A variable gain amplifier is included in the loop so that a proscribed oscillation amplitude can be maintained by adjusting the gain in the loop with a control mechanism as described below.

The driving information extracting circuit 64 is responsive to a monitor output signal from monitor element 28 for generating a drive amplitude signal to control the driving power signal applied to drive element 18 and for generating a drive phase signal used in providing the output signal representing the angular velocity of angular velocity sensor 10. More specifically, driving information extracting circuit 64 includes (FIG. 3) current amplifier 66, band pass filter 68 and averaging circuit 70 which amplifies and smoothes the monitor output signal produced by piezoelectric monitor element 28 to produce a dc voltage (the drive amplitude signal) dependent upon the amplitude of the oscillations of monitor element 28 and a drive phase signal dependent upon the phase of oscillation of monitor element 28 which serves as a phase reference signal used in phase detection as described below.

An automatic gain adjustment circuit 72 includes a comparator 74 and variable gain amplifier 77. Comparator 74 compares the drive amplitude signal with a reference voltage from voltage reference source 76 and adjusts the gain of variable gain amplifier 77 so that the difference between the drive amplitude signal and the reference voltage is zero. The output of variable gain amplifier 77 is applied to driving circuit 62 which produces the driving power signal applied to drive element 18 to maintain constant amplitude of oscillation.

Detecting circuit 80 which includes ampifer 82, bandpass filter 84 and synchronous detector 86 receives a sense output signal from piezoelectric detecting elements 20, 30 and removes unwanted components therefrom to extract a component dependent upon the angular velocity of angular velocity sensor 10. Detecting circuit 80 serves as a synchronous detecting circuit with the drive phase signal from driving information extracting circuit 64 employed as a reference phase signal. Low pass filter 88 smoothes the output from detection circuit 80 which is thereafter applied to D.C. amplifier 90, the output of which is an electrical signal dependent upon angular velocity.

The individual components of electronic circuitry 60 as shown in FIGS. 2 and 3 operate in a manner well known to those skilled in the art and further explanation is not deemed necessary.

The drive amplitude signal is directly related to the amplitude of the physical oscillations of first and second oscillating elements 14, 16 and depends upon the mechanical-to-electrical conversion efficiency of the piezoelectric elements. By controlling the driving power signal in accordance with the invention, variations in the mechanical-to-electrical conversion efficiency of the detecting piezoelectric elements 20, 30 can be compensated for upon conversion of the Coriolis force into the sensed output signal with the result that the relationship between the angular velocity and the sensed output signal can be maintained constant at all times. In this way, compensation for various factors which could affect the performance and accuracy of angular velocity sensor 10 is achieved. Such advantage cannot be achieved simply by driving the driving piezoelectric element 18 with a constant voltage or constant current. In the phase detection portion of the electronic circuitry 60 for providing the output signal, a relative phase change generated between the acting force and the sense output signal at the time of mechanical-to-electrical conversion of the detecting elements 20, 30 can be eliminated to achieve an ideal reference signal in synchronism wth the angular velocity component at all times.

While the invention has been described in its preferred embodiment, it is to be understood that the invention can be embodied in various forms other than those specifically illustrated and described herein and that various modification may be made and would be apparent to those skilled in the art without departing from the spirit and true scope of the invention which is set forth in the claims.

What is claimed is:

1. An angular velocity sensor comprising:
   a first oscillating element including a drive element and a first detecting element, each having a first and second end, said first ends of said drive element and said first detecting element being coupled together;
   a second oscillating element including monitor element and a second detecting element, each having a first and second end, said first ends of said monitor element and said second detecting element being coupled together;
   a coupling member mechanically coupled to said first and second oscillating elements at spaced locations of said coupling member, said coupling member coupling said first and second oscillating elements to each other so that application of a drive signal to said drive element produces an oscillation signal from said first oscillating element at a particular frequency which is coupled through said coupling member to said monitor element which produces a monitor signal at the same frequency and in a particular amplitude and phase relationship to said oscillation signal;
   a single resilient support member coupled at one end thereof to said coupling member midway between said spaced locations thereof at which said first and second oscillating members are coupled to said coupling member; and
   a support to which another end of said resilient member is coupled.

2. The angular velocity sensor of claim 1, wherein said drive element, said detecting elements and said monitoring element comprise piezoelectric material.

3. The angular velocity sensor of claim 2, wherein the piezoelectric material of each of said elements is substantially the same.

4. The angular velocity sensor of claim 1, wherein the physical angle between said drive element and its associated said detecting element is substantially 90° and the physical angle between said monitor element and its associated detecting element is substantially 90°.

5. An angular velocity sensor comprising:
   a first oscillating element including a drive element and a first detecting element, each having a first and second end, said first ends of said drive element and said first detecting element being coupled together;
   a second oscillating element including a monitor element and a second detecting element, each having a first and second end, said first ends of said monitor element and said second detecting element being coupled together;
   means for applying a drive signal to said drive element;
   a coupling member for mechanically coupling said first and second oscillating elements to each other so that application of said drive signal to said drive element produces an oscillating signal from said first oscillating element at a particular frequency which is coupled through said coupling member to said monitor element which produces a monitor signal at the same frequency and in a particular amplitude and phase relationship to said oscillation signal so that said monitor signal can be used to adjust said drive signal and to provide a reference signal for measuring the angular velocity of said angular velocity sensor; and a support structure for supporting said coupling member and said first and second oscillating elements including a base support and a resilient member interconnecting said base support and said coupling member.

6. The angular velocity sensor of claim 5 including indicating means responsive to said reference signal for providing an output signal indicative of the angular velocity of said angular velocity sensor, said indicating means comprising means for producing a drive amplitute signal dependent upon the amplitude of said monitor signal, means for producing a reference voltage signal, circuit means responsive to said drive amplitude signal and said reference voltage signal for producing a difference signal dependent upon the difference between the amplitude of said reference voltage signal and the amplitude of said drive amplitude signal, said means for applying a drive signal being responsive to said difference signal for maintaining a constant amplitude of oscillation of said oscillation signal.

7. An angular velocity sensor comprising:

a first oscillating element including a drive element and a first detecting element, each having a first and second end, said first ends of said drive element and said first detecting element being coupled together;

a second oscillating element including a monitor element and a second detecting element producing a sense output signal, each having a first and second end, said first ends of said monitor element and said second detecting element being coupled together;

means for applying a drive signal to said drive element;

a coupling member for mechanically coupling said first and second oscillating elements to each other so that application of said drive signal to said drive element produces an oscillation signal from said first oscillating element at a particular frequency which is coupled through said coupling member to said monitor element which produces a monitor signal at the same frequency and in a particular amplitude and phase relationship to said oscillation signal so that said monitor signal can be used to adjust said drive signal and to provide a reference signal for measuring the angular velocity of said angular velocity sensor;

a support structure for supporting said coupling member and said first and second oscillating elements including a base support and a resilient member interconnecting said base support and said coupling member; and indicating means responsive to said reference signal for producing a drive phase signal, and means responsive to said drive phase signal and said sense output signal for producing an output signal representative of the angular velocity of said angular velocity sensor.

* * * * *